Sept. 2, 1924.　　　　J. W. BROWN, JR　　　1,506,812
ELECTRIC HEATER
Filed March 24, 1923
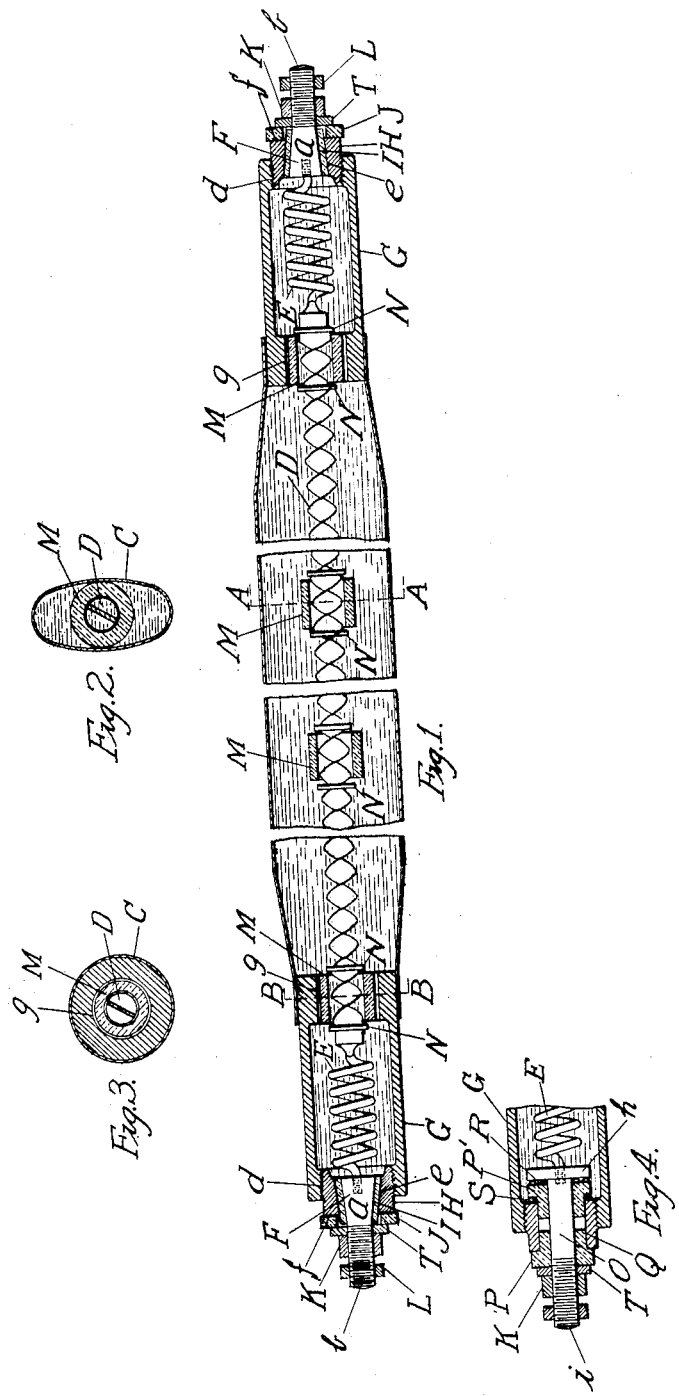
Inventor.
John Wilson Brown Jr
Attorney.

Patented Sept. 2, 1924.

1,506,812

UNITED STATES PATENT OFFICE.

JOHN WILSON BROWN, JR., OF PHILADELPHIA, PENNSYLVANIA.

ELECTRIC HEATER.

Application filed March 24, 1923. Serial No. 627,256.

*To all whom it may concern:*

Be it known that I, JOHN WILSON BROWN, Jr., a citizen of the United States, and resident of the city of Philadelphia, in the county of Philadelphia and State of Pennsylvania, have invented a new and useful Electric Heater, of which the following is a specification.

My invention relates to that class of apparatus in which heat is developed by the passage of electric current through a resistance.

It is the purpose of my invention to provide such a heater which will be cheap in proportion to the maximum current which it will carry without injury, easy to manufacture, durable, and which shall have a considerable capacity for storing heat, so that the heating effect on the apartment to be heated may be practically constant in spite of the fact that the supply of electric current is intermittent or variable.

Referring to the drawings: Fig. 1 is a longitudinal sectional view of my improved heater; Fig. 2 is a cross section of same at A—A; Fig. 3 is a cross section of same at B—B; Fig. 4 is a longitudinal sectional view of a part of the heater showing an alternative construction of the ends.

C is a casing of copper or other metal. Throughout the greater part of its length it is of an oval form as shown in Fig. 2, but at its ends it is cylindrical as shown in Fig. 3. It is thin so that its shape may be readily changed by the development of pressure in its interior. D is the resistance used for the conversion of the electric current into heat. As shown it is a twisted strip of high resistance metal. A strip is used so as to secure a large surface. It is twisted so as to give it transverse resistance to bending. I do not confine myself to this form of resistance. Securely fastened, preferably brazed, to each end of D is a helical spring E which is under all conditions under tension. The purpose of these springs is to take up the differential expansion between casing C and resistance D and to facilitate the assembling of the heater. Securely fastened, preferably brazed, to each spring E is a plug F of brass or some other metal. This plug has a conical portion $a$ and a threaded portion $b$. Securely fastened, in a manner permanently liquid tight, to each end of the casing C is a cylindrical sleeve G, having a reduced cylindrical bore $g$ and a tapered thread $d$. Into this tapered thread $d$ is screwed and sealed the nut H having a conical bore $e$ and a flat face $f$. Into this conical bore $e$ fits a sleeve I of material electrically nonconducting and somewhat compressible, the interior of which fits the conical surface $a$ of plug F. Against face $f$ is placed the washer J of material electrically nonconducting and against this again the metal washer T. The plug F is forcibly drawn into the sleeve I by the nut K acting against the washer T so preventing escape of liquid from the interior of casing C. The nut L is used in connection with nut K to connect wires to the heater. M, M are bushings of material electrically nonconducting, such as porcelain, which prevent the resistance D from being laterally displaced in the casing C. These bushings are secured from endwise displacement by the washers N, N secured to the resistance D. The entire space, not otherwise occupied, inside the casing C is filled with an electrically nonconducting liquid of high boiling point such as the oil used in electric transformers.

In operation heat is developed in resistance D by the current passing through it and this heat is communicated to the liquid which surrounds the resistance. Since the surface of D is always in contact with the liquid, its capacity for communicating heat is very large. The liquid in its turn communicates the heat to the casing C. Where variable or intermittent current is used, the body of the liquid will absorb the heat as fast as developed but, due to its heat storing capacity its temperature and consequently its delivery of heat to the casing will vary with comparative slowness. As the liquid in casing C is heated it expands and if the casing were cylindrical it would be burst by this expansion. But as the casing is oval in section the effect is merely to deform it causing it to approximate to a cylindrical form.

Referring to Fig. 4. O is a metal bolt securely fastened, preferably brazed, to the spring E. This bolt has a head $h$ and a threaded portion $i$. Bolt O passes through two stepped bushings P, P' of porcelain or other electrically nonconducting material. These again rest in the nut Q which is screwed and sealed into the sleeve G. Between the head $h$ of the bolt O and the bushing P' is an oil tight gasket R, preferably of corrugated steel. Between the shoulder of bushing P' and the end of nut Q is an oil tight packing S preferably of lead. Against the end of the bushing P is placed the washer T. The nut K acting against the washer T is forcibly screwed up causing the head of bolt O to compress the gasket R and, acting through bushing P', the packing S. All outlet for the liquid is thus shut off.

I claim—

1. In an electric heater, an integral casing, permanently fixed means for hermetically sealing same, a resistance within the casing and a liquid filling the casing.

2. In an electric heater, a hermetically sealed casing of oval section of material sufficiently flexible to permit expansion of the contained liquid, a resistance within the casing and a liquid filling said casing.

3. In an electric heater, a hermetically sealed casing of such form as to permit expansion of a liquid filling it, a resistance within the casing and a liquid filling the casing.

4. In an electric heater, a casing, a resistance within the casing and means for counteracting the differential expansion between the resistance and the casing.

5. In an electric heater, a casing having a female thread, a nut having a conical bore screwed into said thread, a conical bushing of non-conducting material in said bore, a plug having a conical portion in said bushing, a nut on the threaded end of the plug and a washer of non-conducting material between this nut and the face of the first said nut.

6. In an electric heater, a casing having an orifice, a stopper secured to said orifice, a bushing of nonconducting material in said stopper, a bolt in said bushing, a flange of non-conducting material between the face of said stopper and the head of said bolt, a nut on said bolt and a flange of non-conducting material between the nut and the stopper.

7. In an electric heater, a casing having an orifice, a stopper secured to said orifice, a bushing of non-conducting material in said stopper, a bolt in said bushing, a flange of non-conducting material between the face of said stopper and the head of said bolt, a gasket between the face of said stopper and said flange, a gasket between the head of said bolt and said flange, a nut on said bolt, a flange of non-conducting material between said nut and said stopper, and a washer between said nut and the last said flange.

8. In an electric heater, a casing having an orifice, a stopper secured to said orifice, a bushing of non-conducting material in said stopper, a bolt in said bushing, a flange of non-conducting material between the face of said stopper and the head of said bolt, a gasket between the face of said stopper and said flange, an elastic gasket between the head of said bolt and said flange, and means for compressing said two gaskets and said flange between the head of the bolt and the face of said stopper.

9. In an electric heater, an elongated resistance, washers secured in pairs to said resistance and a bushing of non-conducting material located between each pair of said washers.

10. In an electric heater a resistance formed of a twisted strip of resistance metal.

11. In an electric heater, a resistance composed of a twisted strip of resistance metal, a spring secured to the end of said strip and a bolt secured to the end of the spring.

12. In an electric heater, a casing, a resistance within said casing, washers secured in pairs to said resistance, bushings of non-conducting material located between said pairs of bushings.

13. In an electric heater, a casing composed of a thin tube of oval cross section, and a sleeve secured to the end of same, said sleeve having a female thread and a cylindrical bore.

JOHN WILSON BROWN, Jr.